(12) United States Patent
Bender

(10) Patent No.: US 7,926,829 B2
(45) Date of Patent: Apr. 19, 2011

(54) DUAL TRAILER HITCH

(75) Inventor: David J. Bender, Chardon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

(21) Appl. No.: 12/696,582

(22) Filed: Jan. 29, 2010

(65) Prior Publication Data

US 2010/0127478 A1     May 27, 2010

Related U.S. Application Data

(62) Division of application No. 11/834,108, filed on Aug. 6, 2007, now Pat. No. 7,673,894.

(51) Int. Cl.
    *B60D 1/07*      (2006.01)

(52) U.S. Cl. ............... 280/406.1; 280/490.1; 280/491.1; 280/416.1; 280/456.1; 280/511; 280/491.5

(58) Field of Classification Search ........................ None
See application file for complete search history.

(56) References Cited

U.S. PATENT DOCUMENTS

| | | | |
|---|---|---|---|
| 2,827,307 A * | 3/1958 | Osborn | 280/416.3 |
| 3,801,134 A | 4/1974 | Dees | |
| 3,951,434 A | 4/1976 | Sause | |
| 4,032,170 A | 6/1977 | Wood | |
| 4,116,460 A | 9/1978 | Drower | |
| 4,133,572 A | 1/1979 | Robbins | |
| D281,489 S | 11/1985 | Hancock | |
| 5,277,447 A | 1/1994 | Blaser | |
| 5,839,744 A * | 11/1998 | Marks | 280/416.1 |
| 6,068,281 A | 5/2000 | Szczypski | |
| 6,217,054 B1 | 4/2001 | Klimek et al. | |
| 6,969,085 B2 | 11/2005 | Causey, Jr. | |
| 7,025,370 B2 | 4/2006 | Anderson et al. | |
| 7,114,740 B1 | 10/2006 | Mann et al. | |
| 7,347,440 B2 * | 3/2008 | Shannon | 280/416.1 |
| 2006/0214391 A1 | 9/2006 | Columbia | |
| 2008/0073872 A1 | 3/2008 | Scott | |

OTHER PUBLICATIONS

Croft Trailer Supply, "H3BOS/RING Coupler (http://www.croft-trailer.com/site/products/175/176/177/1267/details.html)," printed from Internet, 3 pages, (Nov. 27, 2007).

* cited by examiner

*Primary Examiner* — Paul N Dickson
*Assistant Examiner* — Marlon A Arce
(74) *Attorney, Agent, or Firm* — Hahn Loeser & Parks LLP

(57) ABSTRACT

A trailer hitch includes multiple hitch connectors for connecting the trailer to a towing vehicle in different ways. The trailer hitch includes multiple connectors at distal ends of the hitch body. The trailer hitch can be position such that either end is facing the towing vehicle. Mounting plates secure the trailer hitch to the trailer frame and may be adjustable vertically to raise or lower the height of the trailer hitch with respect to the trailer frame.

14 Claims, 5 Drawing Sheets

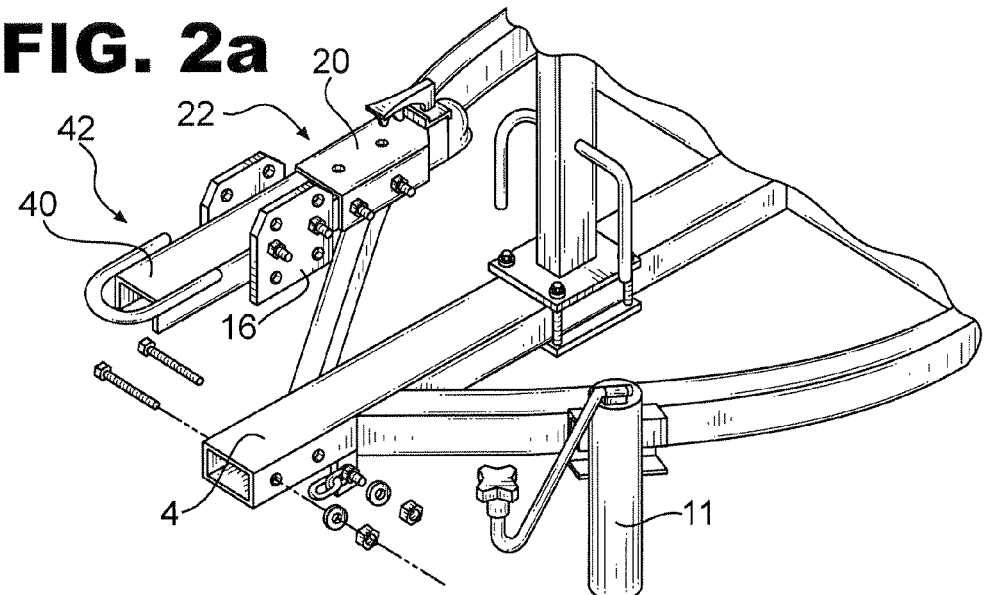
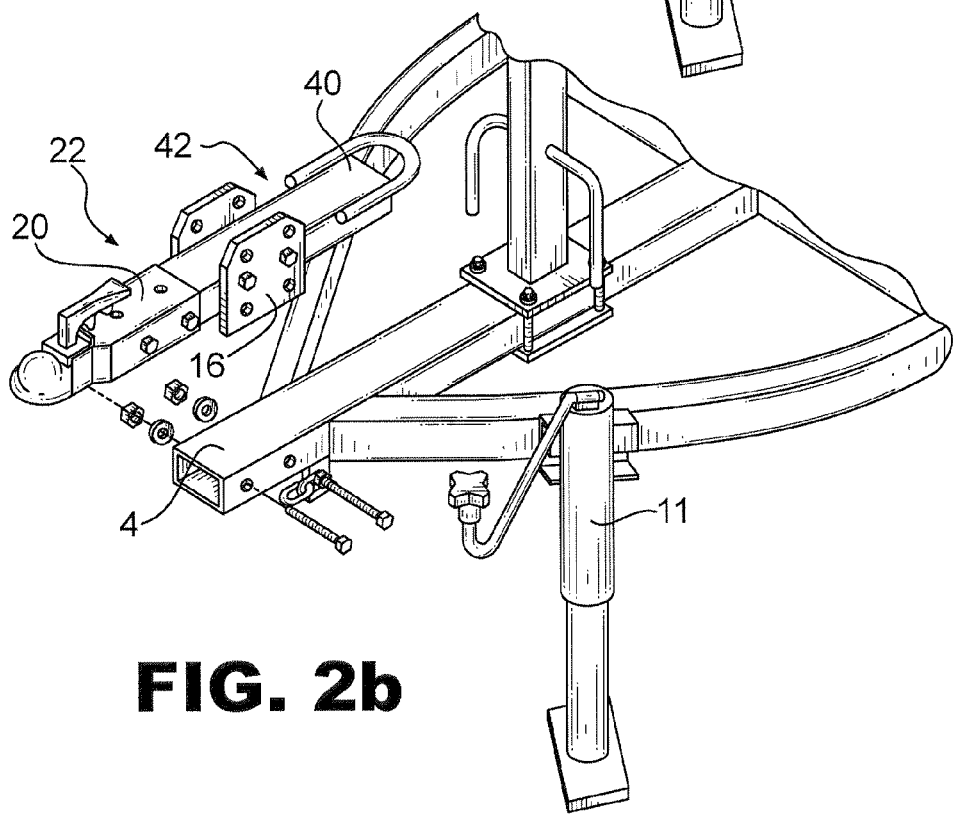

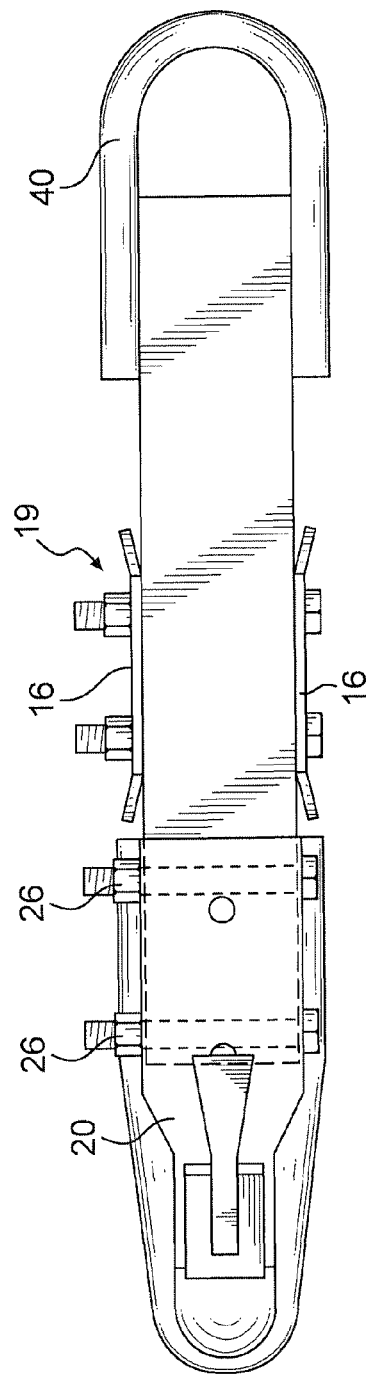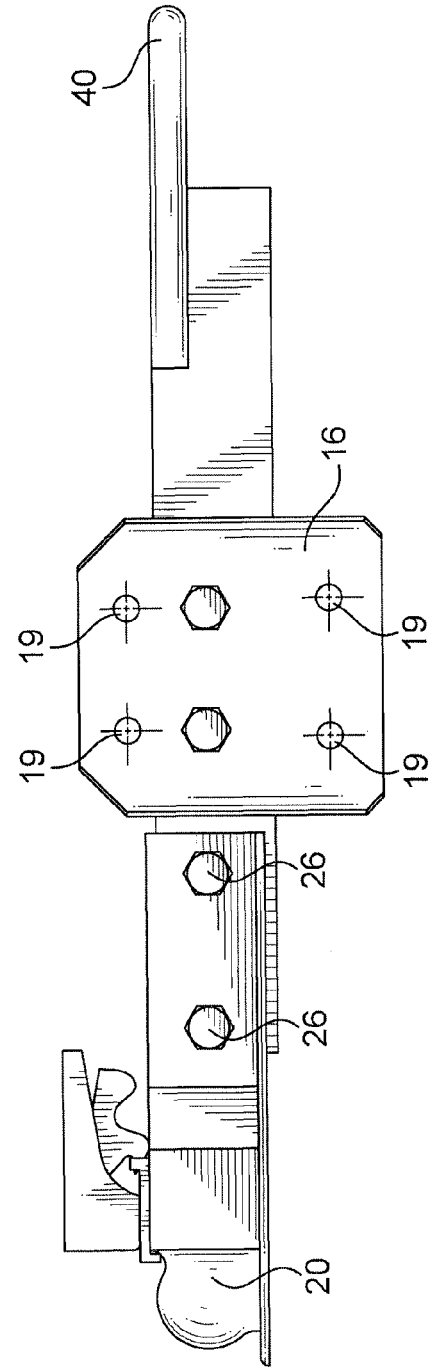
FIG. 3a
FIG. 3b

DUAL TRAILER HITCH

This application is a divisional application of U.S. patent application Ser. No. 11/834,108, filed Aug. 6, 2007.

TECHNICAL FIELD

The present invention pertains to trailers for carrying a welding power supply, and more particularly, to trailers having a multi-functional trailer hitch.

BACKGROUND OF THE INVENTION

Trailers are well known to carry a payload during travel between sites. Some trailers carry materials, tools or equipment to and from locations such as a construction work site. In one instance, the trailer may carry a welding power supply, which may be used at the work site. The trailers typically include a frame and ground engaging wheels connected to one or more axles. A trailer bed carries the cargo and may be enclosed by ceiling and side walls. A trailer hitch connects the trailer to a towing vehicle.

Frequently, welding is required where supply power may not be readily available. As such, the welding power supply may be an engine driven welding power supply incorporating a generator. The generator may supply power to the welder as well as to other power tools as may be needed on site. As different applications require different versions of welders and power tools, the trailer may be designed to carry one of many different types of welding power supplies.

Different types of trailer hitches are known in the art for attaching trailers to the towing vehicle. One type of hitch system uses a ball hitch. Typically, ball hitches include a generally spherical shaped ball with a stem extending from a base. The stem may engage a head mounted on the towing vehicle using a ball hitch fitting. A coupling member may engage the ball hitch in loose contact with the head and may be secured thereto in preparation for towing. Other types of hitches include lunette eye couplers. The lunette type tongue includes a rigid, durable, hitch ring or eye in the shape of a torus, which can be placed over or secured to a vertical post or pin on the vehicle. While the lunette eye allows a certain amount of vertical movement of the trailer tongue along the vertical post, the primary movement is horizontal in nature. Lunette eye trailers are particularly advantageous for construction equipment and other heavy-duty off-road type usage. A lunette hitch obviates the need for sockets and other closed hitching structures that are subject to corrosion, dirt collection and deterioration when exposed to weather and other severe operating conditions.

Typically trailers utilize one particular type of hitch. A ball hitch may be used to tow a trailer over even terrain like paved roadway surfaces. A lunette eye hitch may be used when towing over uneven bumpy ground including ruts such as may be found at a construction site or along a pipeline. The lunette eye hitch allows for greater movement between the towing vehicle and the trailer as may be needed in these circumstances. However, a trailer may need to be towed over both uneven and smooth surfaces. But this requires removing and replacing the hitch, which is often not possible or practical. Hitches used today do not incorporate a versatile multi-functional device that will easily obviate this problem.

In view of the current state of the art, there is a need for a trailer and hitch system that can easily switch between different types of hitch systems. The embodiments of the present invention obviate the aforementioned aspects of trailer hitches by including a new and novel hitch system that incorporates dual trailer hitch connectors in a single hitch device.

BRIEF SUMMARY

The embodiments of the present invention are directed to hitching devices for towing a trailer that include a hitch body portion having first and second sides, of which the hitch body portion may be substantially rigid. The hitch body portion may include a first hitch connector extending from the first side of the hitch body portion and a second hitch connector extending from the second side of the hitch body portion, where the first hitch connector is substantially different from the second hitch connector.

In one aspect of the embodiments of the present invention the first hitch connector is selectively removable from the hitch body portion.

In another aspect of the embodiments of the present invention at least one of the first or second hitch connectors may be a ball hitch connector. The other hitch connector may be a lunette eye connector.

In yet another aspect of the embodiments of the present invention the height of the hitch body portion is selectively adjustable with respect to the associated trailer. The longitudinal position of the hitch body portion may also selectively adjustable.

In still another aspect of the embodiments of the present invention the hitch body portion may include one or more sets of apertures and fasteners for affixing the hitch body portion to the associated trailer.

Another embodiment of the present invention includes a trailer hitch for towing an associated trailer that includes a hitch body portion having a first side and a first hitch connector extending from the first side of the hitch body portion. A second hitch connector may be received at least partially within the hitch body portion, where the second hitch connector extends from the first side of the hitch body portion and may be selectively retractable with respect to the first hitch connector.

One aspect of the embodiments of the present invention includes a first hitch connector that is substantially different from the second hitch connector portion.

Another aspect of the embodiments of the present invention includes a second hitch connector that is pivotally connected to the hitch body portion, and wherein the second hitch connector is positioned to engage an associated towing device in a first position and retracted into the hitch body portion in a second position.

In yet another embodiment of the present invention a trailer includes a trailer frame having a payload region and at least a first ground engaging wheel rotatably connected with respect to the trailer frame. The trailer further includes a trailer hitch operatively connected to the trailer frame, where the trailer hitch comprises a hitch body portion having first and second sides, a first hitch connector extending from the first side of the hitch body portion, and a second hitch connector operatively connected to the hitch body portion, and wherein the first hitch connector is substantially different from the second hitch connector portion.

BRIEF DESCRIPTION OF THE DRAWINGS

FIG. 2a is a perspective view of a trailer and dual hitch according to the embodiments of the invention.

FIG. 2b is a perspective view of a trailer and dual hitch according to the embodiments of the invention.

FIG. 3a is a top view of a dual hitch according to the embodiments of the invention.

FIG. 3b is a side view of a dual hitch according to the embodiments of the invention.

DETAILED DESCRIPTION OF THE INVENTION

Figure 1:
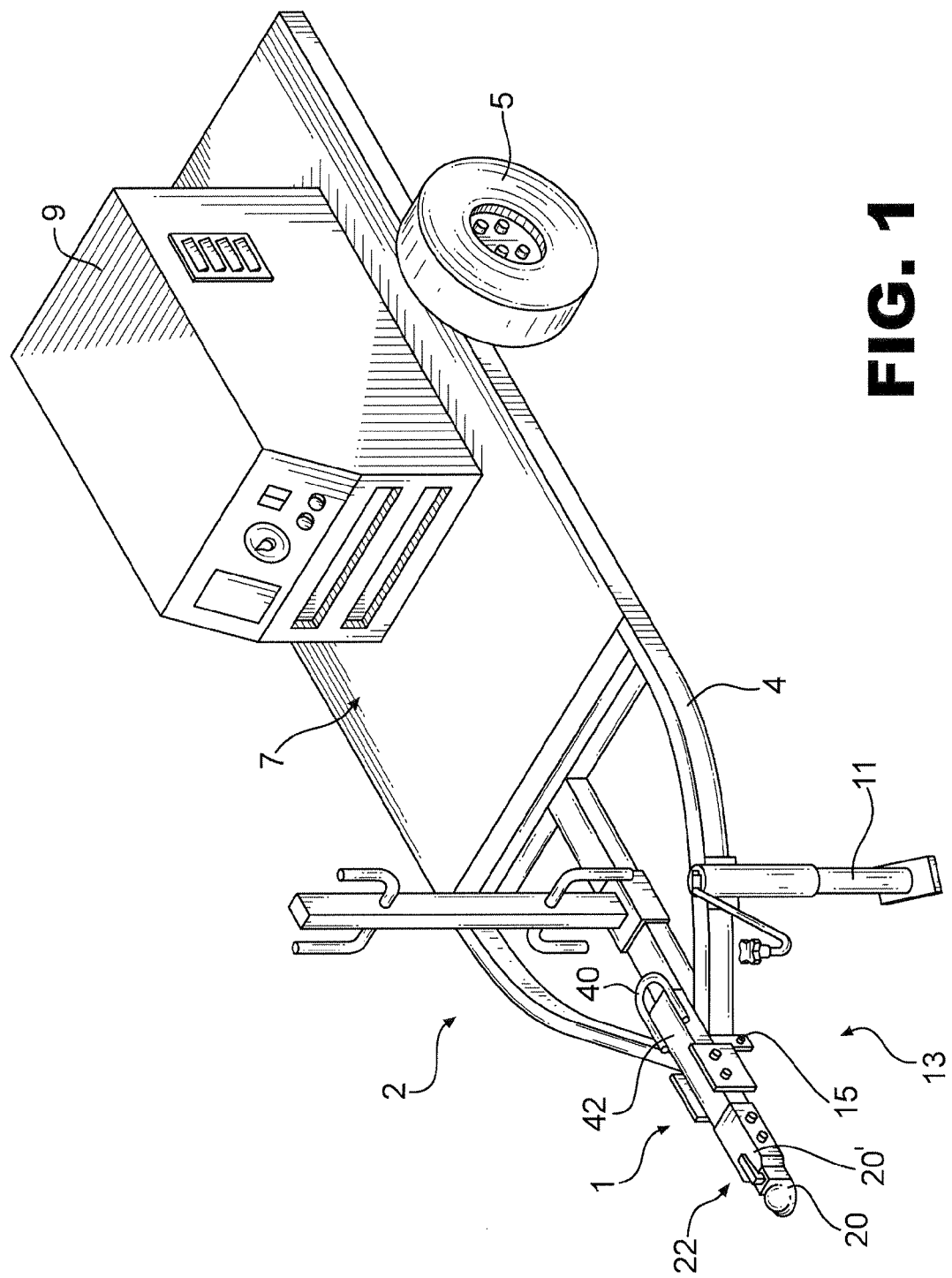
FIG. 1 is a perspective view of a welder and a trailer incorporating a dual hitch according to the embodiments of the invention.

Referring now to the drawings wherein the showings are for purposes of illustrating embodiments of the invention only and not for purposes of limiting the same, FIG. 1 shows a trailer 2 incorporating a useful and novel trailer hitch or hitching device, depicted generally at 1. The trailer 2 may include a trailer frame 4 and one or more trailer wheels 5 in rotational connection with the trailer frame 4 and may further include a payload region 7 for carrying one or more cargo items, which in an exemplary manner may be a welding power supply 9 or an engine driven welding power supply 9. The trailer 2 may also include an adjustable stand 11 for adjusting the height of the front end 13 of the trailer 2. However, any means may be used for raising and/or lowering the front end 13 of the trailer 2. The trailer hitch 1 may be a generally longitudinal and substantially rigid trailer hitch 1 and may be attached to the frame 4 via fasteners 15, which may be threaded bolts. In one embodiment, the trailer hitch 1 may be a dual trailer hitch 1 having a hitch body portion 23 and first and second trailer hitch connectors 20 and 40 extending from distal ends of the trailer hitch 1. Accordingly, the first end 22 of the trailer hitch 1 may include a ball hitch connector 20' and the second end 42 of the trailer hitch 1 may include a lunette eye connector 40'. In this manner, the trailer hitch 1 may include first and second substantially different trailer hitch connectors extending from distal ends of the hitch body portion 23.

With reference now to FIGS. 1 and 2, the trailer hitch 1 may be selectively adjustable to position the trailer hitch 1 for connecting to one or more different types of towing vehicle mounts. In one embodiment, the trailer hitch 1 may include one or more mounting plates 16 for connecting the hitch body portion 23 to the trailer frame 4. The mounting plates 16 may be affixed to the trailer frame 4 by way of fasteners 15 as mentioned above, which may be threaded bolts, rigid studs, quick release pins or any other type of mechanism suitable for attaching the hitch body portion 23 to the trailer frame 4. It is noted that the fasteners 15 may be selectively removable fasteners 15 for allowing the operator to detach, reposition and reattach the trailer hitch 1 quickly and easily. In this way, the operator may selectively position the trailer hitch 1 in one or more orientations for connecting to a specific type of towing vehicle mount. The mounting plates 16 may likewise be affixed to the hitch body portion 23 via selectively removable fasteners 15. However, it is also contemplated that the mounting plates 16 may be fixedly attached to the hitch body portion 23 such as, for example, by welding. In another embodiment the mounting plates 16 may be integrally formed with the hitch body portion 23. The cross section of the hitch body portion 23 may conform to the trailer frame 4 for securely connecting the components together as mentioned above. In an exemplary manner, the trailer frame 4 may be constructed from rigid square tubing. Accordingly, the hitch body portion 23 may have a substantially U-shaped cross section with dimensions proportionate to the square tubing thus providing a secure connection between the components. However, it is to be construed that any type and configuration of trailer frame, and any type or configuration of hitch body portion may be chosen as is appropriate for use with the embodiments of the present invention.

With reference now to FIGS. 2 and 3, the height of the trailer hitch 1 may also be selectively adjustable. That is to say that the trailer hitch 1 may be adjustable to raise or lower the height of the trailer hitch connectors 20 and 40 with respect to the trailer frame 4. In one embodiment, the mounting plates 16 may have one or more sets of apertures 19 vertically fashioned therein for fastening the trailer hitch 1 to the trailer frame 4 at different positions. The operator may select the desired height of the trailer hitch 1 by matching the respective apertures 19 of the mounting plates 16 to holes in the trailer frame 4 and thereafter attaching the trailer hitch 1 with the fasteners 15. It is noted that the mounting plates 16 may have any dimension and/or any number or apertures 19 as chosen with sound engineering judgment. A person of ordinary skill in the art will understand that the trailer hitch 1, in this manner, is discretely positionable (positionable in a finite number of positions). However, other embodiments are contemplated that provide for infinite positioning through a range of heights. Still, any manner of adjusting the height of the trailer hitch 1 with respect to the trailer frame 4 may be chosen with sound engineering judgment.

With continued reference to FIG. 3, as mentioned above the trailer hitch 1 may include first and second different trailer hitch connectors 20 and 40. One or more of the trailer hitch connectors 20 and 40 may be removable from the hitch body portion 23. In one embodiment, the ball hitch connector 20' may be selectively removable. Fasteners 26 may hold the ball hitch connector 20' in place during use. When desired, the ball hitch connector 20' may be unfastened and detached. A replacement trailer hitch connector may then be installed in its place or the trailer hitch 1 may be utilized with only a single trailer hitch connector 40. The replacement trailer hitch connector may be of the same type and size connector, a different size connector or a different type of connector altogether. In fact, any type of replacement may be chosen as is appropriate for use with the embodiments of the present invention.

With reference to FIGS. 1 through 3, operation of the trailer hitch 1 will now be discussed. The operator may disconnect the trailer 2 from the towing vehicle, not shown. The operator may then uninstall the fasteners 15 and remove the trailer hitch 2 from the trailer frame 14. If desired, the first trailer hitch connector 20 may be disassembled and substituted with a replacement trailer hitch connector. The operator may then position either end of the trailer hitch 1 as desired for connecting to the towing vehicle. The fasteners 15 may then be re-installed and the trailer 1 reconnected to the towing vehicle. If desired, the operator may install the trailer hitch 1 at a different height by inserting the fasteners 15 into a different set of apertures 19.

Figure 4:
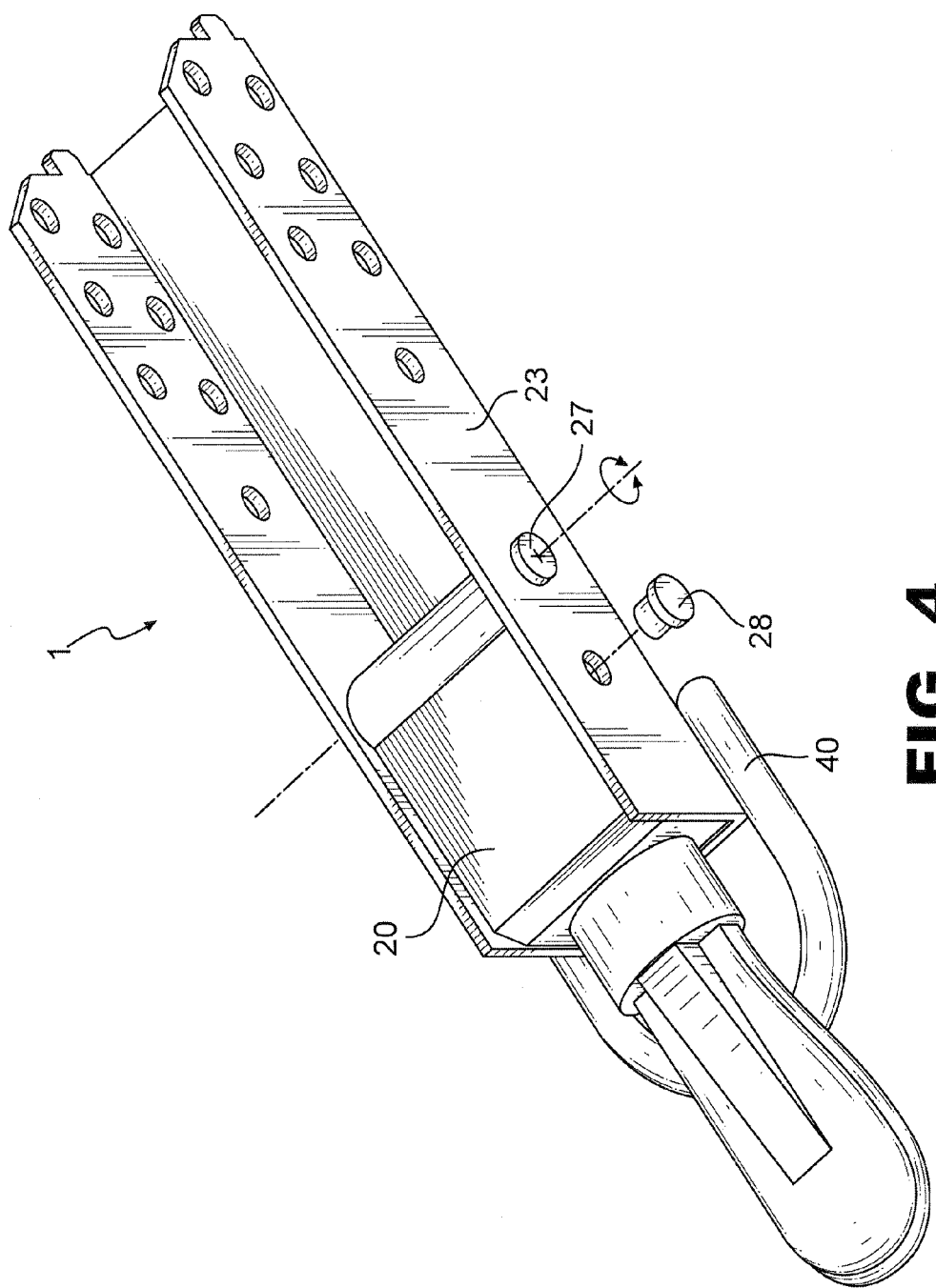
FIG. 4 is a perspective view of a dual hitch assembly according to the embodiments of the invention.
Figure 5:
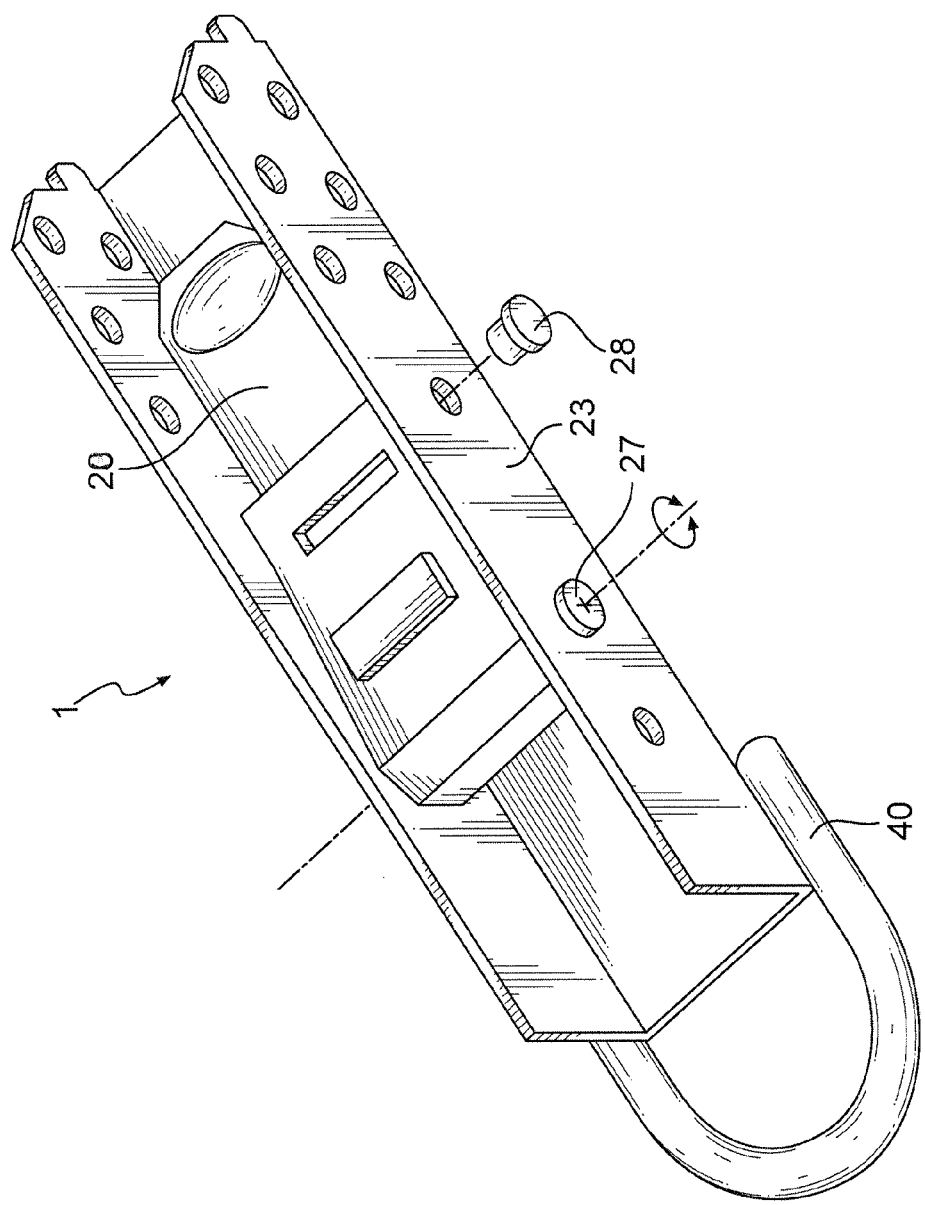
FIG. 5 is a perspective view of a dual hitch assembly according to the embodiments of the invention.

With reference now to FIGS. 4 and 5, another embodiment of the subject invention includes a trailer hitch 1 having first and second substantially different trailer hitch connectors 20 and 40 extending substantially from the same end of the hitch body portion 23. In this embodiment, one of the first and second trailer hitch connectors 20 and 40 may be retractable with respect to the other trailer hitch connector 40 and 20. The first trailer hitch connector 20 may be pivotally mounted within the body hitch portion 23 of the trailer hitch 1 via an axle member 27. When required for use, the first trailer hitch connector 20 may be extended from the hitch body portion 23 into position for connecting to a towing vehicle. A locking mechanism 28, which may be a pin 28, may then be inserted to secure the first hitch connector in place with respect to the hitch body portion 23. To use the second hitch connector 40, the operator may remove the locking mechanism 28, pivot the first hitch connector 20 back into the hitch body portion 23 and secure the locking mechanism in place thus retracting the first hitch connector 20. It will be understood by persons of ordinary skill in the art that the axle member 27 and locking mechanism 28 may be completely removed whereby the first hitch connector 20 may be replaced with a replacement hitch connector of any type and having any size or configuration chosen with sound engineering judgment. The second hitch connector 40, which may be a lunette eye hitch connector 40', may be fixedly connected to the hitch body portion 23. With the first hitch connector 20 retracted, the second hitch connector 40 remains in position and ready for connecting to a towing vehicle. The present embodiment therefore describes a retracting hitch member that pivots into and out of engagement with a towing vehicle mount. It is also contemplated that the retracting hitch member may longitudinally slide into and out of engagement with a towing vehicle mount. Similarly, locking mechanism 28 may be used to secure the position of the first hitch connector 20.

The invention has been described herein with reference to the preferred embodiment. Obviously, modifications and alterations will occur to others upon a reading and understanding of this specification. It is intended to include all such modifications and alternations in so far as they come within the scope of the appended claims or the equivalence thereof.

What is claimed is:

1. A trailer, comprising:
   a trailer frame having a payload region;
   at least a first ground engaging wheel rotatably connected with respect to the trailer frame;
   a trailer hitch operatively connected to the trailer frame, the trailer hitch including a hitch body portion having first and second sides, wherein the hitch body portion is selectively adjustable with respect to the associated trailer;
   a first hitch connector extending from the first side of the hitch body portion;
   a second hitch connector operatively connected to the hitch body portion, wherein the first hitch connector is substantially different from the second hitch connector portion;
   at least a first mounting plate operatively attached to the hitch body portion, wherein the at least a first mounting plate includes at least first and second sets of apertures for selectively adjusting the mounting height of the trailer hitch; and,
   one or more fasteners for fixedly mounting the hitch body portion to the associated trailer.

2. The trailer as defined in claim 1, wherein the second hitch connector extends from the second side of the hitch body portion.

3. The trailer as defined in claim 2, wherein the second hitch connector is selectively detachable from the hitch body portion.

4. The trailer as defined in claim 3, wherein the height of the second hitch connector is selectively adjustable with respect to the trailer frame.

5. The trailer as defined in claim 1, wherein the second hitch connector extends from the first side of the hitch body portion; and
   wherein the second hitch connector is retractable with respect to the first hitch connector.

6. The trailer as defined in claim 1, wherein the second hitch connector is pivotally connected to the hitch body portion; and
   wherein the second hitch connector is positioned to engage an associated towing device in a first position, and wherein the second hitch connector is retracted into the hitch body portion in a second position.

7. The trailer as defined in claim 1, wherein at least one of the first or second hitch connectors is a ball hitch connector.

8. The trailer as defined in claim 1, wherein the first hitch connectors is a lunette eye hitch connector.

9. A trailer, comprising:
   a trailer frame having a payload region;
   at least a first ground engaging wheel rotatably connected with respect to the trailer frame;
   a trailer hitch operatively connected to the trailer frame, the trailer hitch comprising
       means for selectively adjusting at least a portion of the trailer hitch with respect to the associated trailer;
       a first means for hitching the trailer extending from a first side of the means for selectively adjusting at least a portion of the trailer hitch;
       a second means for hitching the trailer operatively connected to the means for selectively adjusting at least a portion of the trailer hitch, wherein the a first means for hitching is substantially different from the second means for hitching, the second means operable in a first position and a second position;
       means for selectively adjusting the mounting height of the trailer hitch operatively attached to the means for selectively adjusting at least a portion of the trailer hitch;
       means for fixedly mounting the trailer hitch to the associated trailer;
       wherein the second means for hitching is positioned to engage an associated towing device in the first position, and
       wherein the first means for hitching is positioned to engage the associated towing device in the first position when the second means is in the second position.

10. The trailer as defined in claim 9, wherein the second means for hitching extends from a second side of the means for selectively adjusting at least a portion of the trailer hitch.

11. The trailer as defined in claim 9, wherein the second means for hitching is selectively detachable from the trailer hitch.

12. The trailer as defined in claim 9, wherein the height of the second means for hitching is selectively adjustable with respect to the trailer frame.

13. The trailer as defined in claim 9, wherein the second means for hitching extends from the first side of the means for selectively adjusting at least a portion of the trailer hitch; and
   wherein the second means for hitching is retractable with respect to the first means for hitching.

14. The trailer as defined in claim 9, wherein the second means for hitching is pivotally connected to the means for selectively adjusting at least a portion of the trailer hitch; and
   wherein the second means for hitching is positioned to engage an associated towing device in a first position, and wherein the second means for hitching is retracted in a second position.

* * * * *